(12) United States Patent
Handrick

(10) Patent No.: US 6,405,765 B1
(45) Date of Patent: Jun. 18, 2002

(54) FLUID RECOVERY DEVICE WITH PIVOTING NOZZLE

(76) Inventor: Rickie Michael Handrick, 711 N. Cedar St. Apt #A, Marshfield, WI (US) 54449

( * ) Notice: Subject to any disclaimer, the term of this patent is extended or adjusted under 35 U.S.C. 154(b) by 0 days.

(21) Appl. No.: 09/472,414

(22) Filed: Dec. 27, 1999

Related U.S. Application Data

(60) Provisional application No. 60/113,255, filed on Dec. 21, 1998.

(51) Int. Cl.[7] .................................................. B65B 1/30
(52) U.S. Cl. .................... 141/98; 141/106; 141/364; 141/340; 141/331
(58) Field of Search .......................... 141/98, 331, 340, 141/341, 342, 343, 364, 106, 114, 332, 344, 363, 383, 384; 248/311.3; 215/306, 317; 220/375, 787, 786, 784, 782, 789, 790

(56) References Cited

U.S. PATENT DOCUMENTS

| 1,720,835 | A | * | 7/1929 | Holmdahl ................... 215/306 |
| 2,767,744 | A | * | 10/1956 | Beerman ..................... 141/382 |
| 3,592,245 | A | * | 7/1971 | Schneller et al. ............. 141/25 |
| 3,939,884 | A | * | 2/1976 | Mader ........................ 141/333 |
| 4,212,335 | A | * | 7/1980 | Bova ......................... 141/382 |
| 4,386,638 | A | * | 6/1983 | Hall et al. .................. 141/382 |
| 4,665,958 | A | * | 5/1987 | Holloway et al. ........... 141/106 |
| 4,823,848 | A | * | 4/1989 | Sentmore, Sr. et al. ..... 141/334 |
| 4,832,095 | A | * | 5/1989 | Bonnell ...................... 141/106 |
| 4,860,805 | A | * | 8/1989 | Townsend .................. 141/382 |
| 4,970,817 | A | * | 11/1990 | Mansfield ................... 141/340 |
| 5,074,343 | A | * | 12/1991 | Tyree, Jr. ................... 141/331 |
| 5,195,567 | A | * | 3/1993 | Tyree, Jr. ................... 141/340 |
| 5,228,488 | A | * | 7/1993 | Fletcher ..................... 141/331 |
| 5,269,354 | A | * | 12/1993 | Koberg ...................... 141/106 |
| 5,287,898 | A | * | 2/1994 | Falb et al. .................. 141/329 |
| 5,325,898 | A | * | 7/1994 | Forgnone ................... 141/106 |
| 5,382,408 | A | * | 1/1995 | Perlman ..................... 215/306 |
| 5,385,180 | A | * | 1/1995 | Wittman .................... 141/340 |
| 5,477,897 | A | * | 12/1995 | Scofield ..................... 141/106 |
| 5,564,850 | A | * | 10/1996 | Nagaoka ...................... 401/37 |
| 5,921,296 | A | * | 7/1999 | Porter et al. ................ 141/384 |
| 5,967,201 | A | * | 10/1999 | Gasior ....................... 141/332 |
| 5,975,156 | A | * | 11/1999 | Senour ....................... 141/331 |
| 6,079,458 | A | * | 6/2000 | Sten .......................... 141/382 |
| 6,098,678 | A | * | 8/2000 | Shears ....................... 141/331 |
| 6,116,299 | A | * | 9/2000 | Cummins et al. ........... 141/340 |

FOREIGN PATENT DOCUMENTS

| CA | 471333 | * | 2/1951 | ................. 141/340 |
| GB | 280504 | * | 4/1928 | ................. 141/340 |
| NL | 59874 | * | 9/1947 | ................. 141/365 |

* cited by examiner

Primary Examiner—Gregory L. Huson
Assistant Examiner—Khoa D. Huynh
(74) Attorney, Agent, or Firm—Tipton L. Randall

(57) ABSTRACT

A wall mounted device for recovering oil or other fluids from at least one open mouthed container in its inverted position comprising a funnel with one or more inlets at its upper portion for retaining the neck of a container, and an outlet port at its lower end. The outlet port has a pivoting threaded nozzle for receivably adapting a container so that the device can be mounted in close proximity to a wall and provide the ability to view a sight strip that is commonly used on plastic containers. The upper portion includes closures for the inlet(s) when they are not in use preventing contamination. The device is made of a transparent plastic material allowing constant random inspection of the interior. The upper and lower portions may be easily disconnected for cleaning by releasing a snap from its catch.

12 Claims, 4 Drawing Sheets

FLUID RECOVERY DEVICE WITH PIVOTING NOZZLE

CROSS REFERENCE TO RELATED APPLICATIONS

PROVISIONAL 60/113,255 filed Dec. 21, 1998.

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

This invention relates to a funneling tool and more specifically to a device for recovering oil or other fluids from at least one container.

Changing or adding oil to your own engine requires the use of quart oil cans. The average automobile requires at least four quarts. Oil is a viscous fluid and requires time to drain any amounts remaining. Because of temperatures, viscosity, and impatience, much of this fresh oil in many cases is a total loss. The amounts of oil that can be accumulated are appreciated, and it would be desirable to have a device for promoting the recovery of these fluids.

Prior art devices do exist for draining and collecting oil from one or more oil cans, but these devices are to bulky or take up too much work space, and do not adequately prevent spill or overflow. undetected. Dirt or particulate matter can cause premature engine wear or even damage, and it is desirable to improve upon prior art devices.

U.S. Pat. No. 5,269,354 issued to Koberg discloses a device which suffer a number of disadvantages which are:
- (a) once the recovery container is fastened, it can not be adjusted, creating the inability to view the fluid level through a sight strip which is commonly used on plastic containers;
- (b) the recovery container must spin onto the main embodiment and ends in a random position causing a greater distance between the main embodiment and the mounting surface, and results in much heavier, bulkier, and more expensive tool;
- (c) it is hard to determine the level of fluid in the recovery container at all times because of the random position the recovery container ends in when threaded on, and can result in seepage or spill;
- (d) the main embodiment of the device is pigmented and therefore the interior can not be viewed for possible contaminants entering the system;
- (e) the device does not include the use of larger mouthed oil containers within the same tool.

U.S. Pat. No. 5,325,898, issued to Forgnone describes a device that is an open trough, and some of the disadvantages are;
- (a) the inability to mount the device on a wall or other convenient location;
- (b) the receiving container is unattached to the device;
- (c) the device does not consider the use of larger mouthed containers;
- (d) the device is an open trough susceptible to contamination.

In view of the limitations of the prior art devices, it is desirable to improve upon the funneling devices of the prior art so that a device is;

- (a) capable of adjusting the recovery container once it is fastened so the fluid level can be viewed in a sight strip which is commonly used on plastic containers, and would prevent spill or overflow;
- (b) capable of being mounted in close proximity to a wall, requiring less work space;
- (c) capable of receiving other filler-neck sizes within the same tool, and making it more versatile;
- (d) capable of viewing the interior of the tool for monitoring fluids, or detecting contamination before it enters into the recovery container.

BRIEF SUMMARY OF THE INVENTION

This invention relates to a wall mounted funneling tool for collecting viscous fluids from their containers in an inverted position, and into a recovery container that is adjustably mounted and of similar origin.

BRIEF DESCRIPTION OF THE SEVERAL VIEWS OF THE INVENTION

DETAILED DESCRIPTION OF THE PREFERRED EMBODIMENTS

Figure 1:
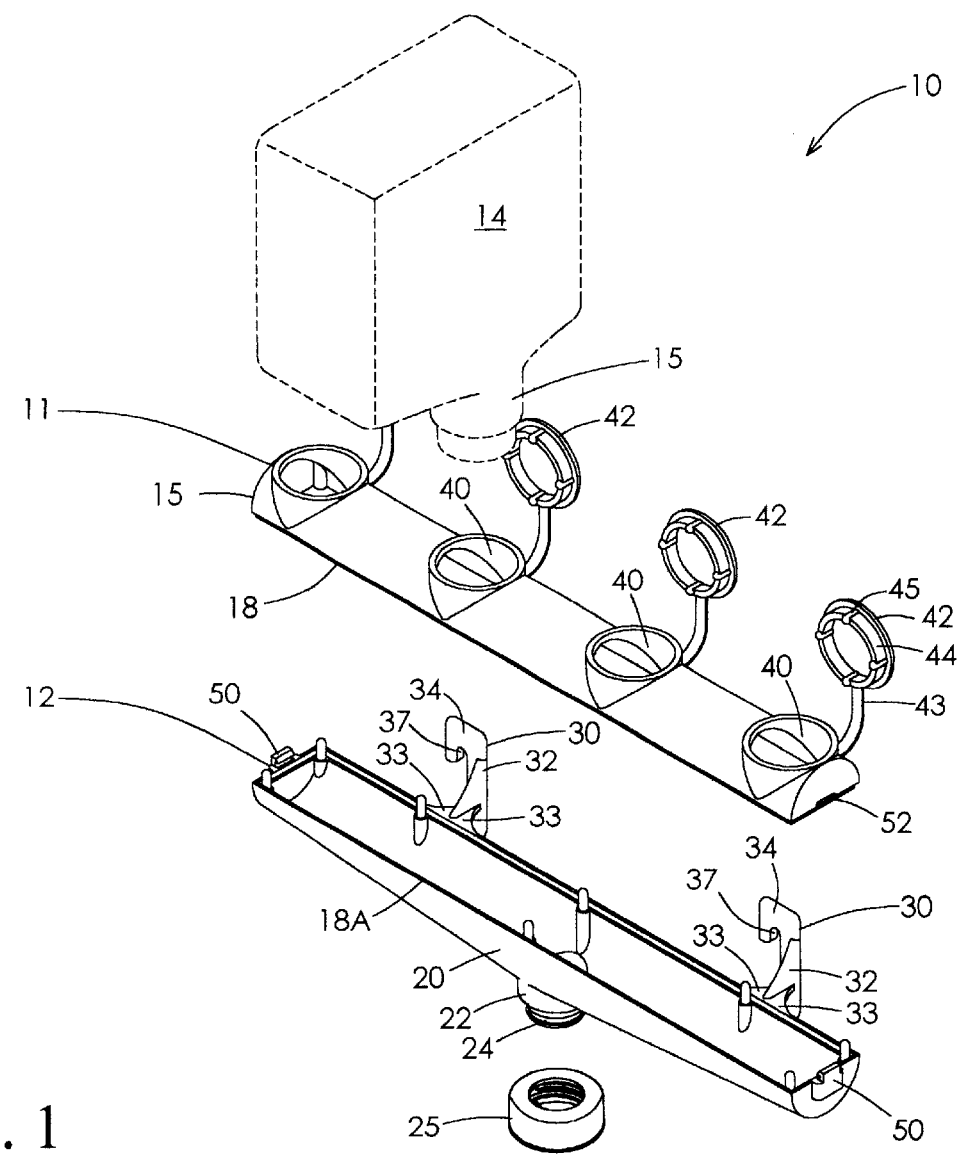
FIG. 1 shows an exploded perspective view of the fluid recovery device.

Referring to all the present figures, FIG. 1 shows an exploded view of a typical embodiment of the fluid recovery device of the present invention to be noted generally as 10 for draining one or more inverted containers 14. For the purpose of this disclosure, container 14 and 28 (shown in phantom) will be discussed as being an open mouthed plastic quart oil container having an offset filler neck 15. It is to be understood that other sizes and shapes of containers or other fluids are considered as being usable in accordance with the present invention.

Figure 2:
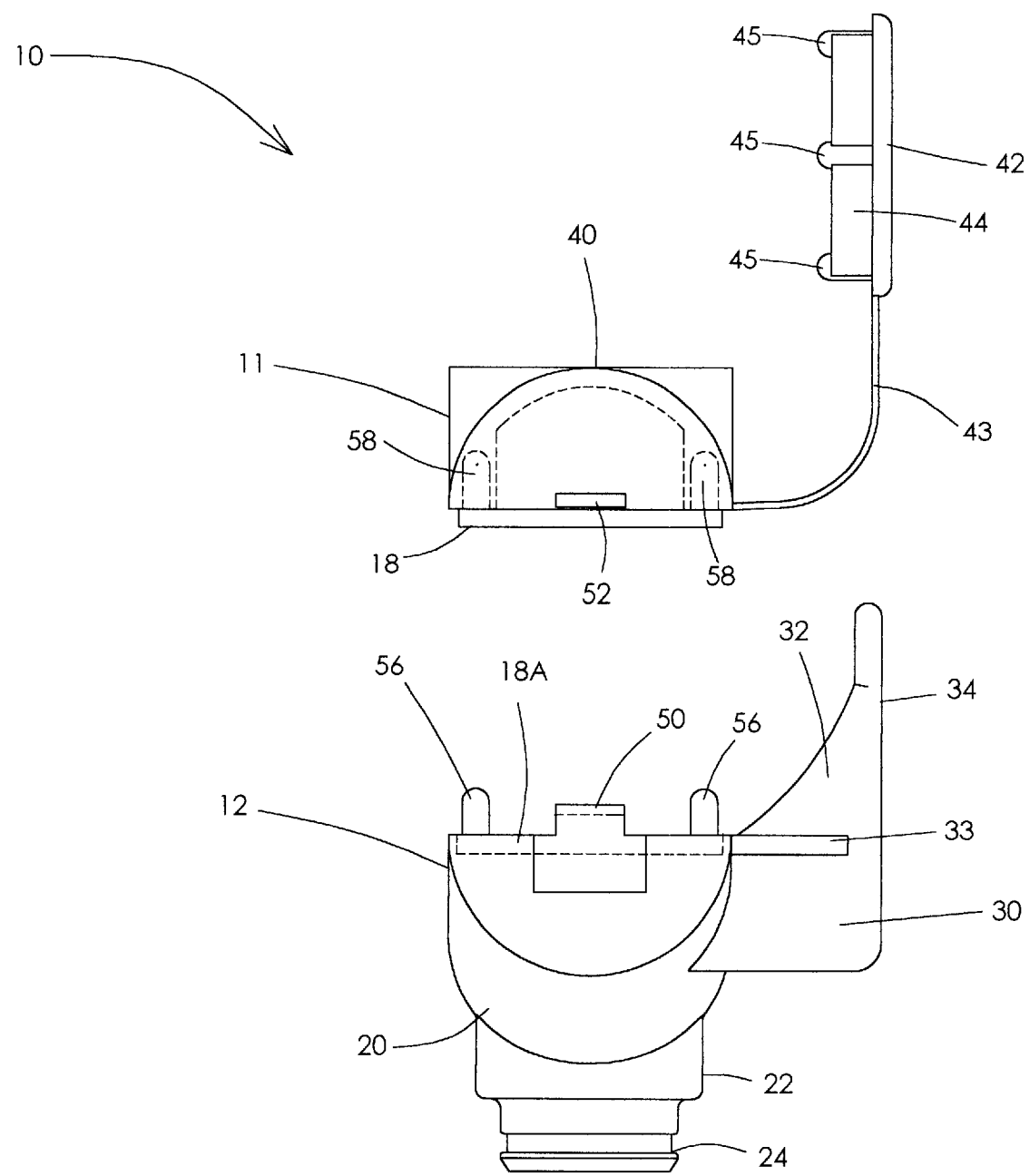
FIG. 2 shows an exploded end view of the fluid recovery device.
Figure 2:
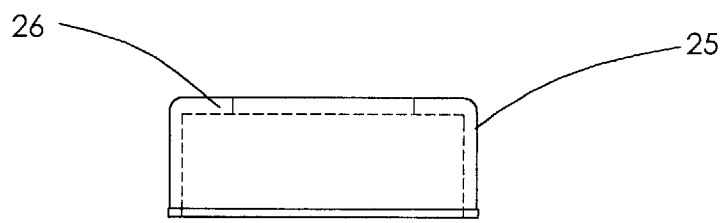
Figure 3:
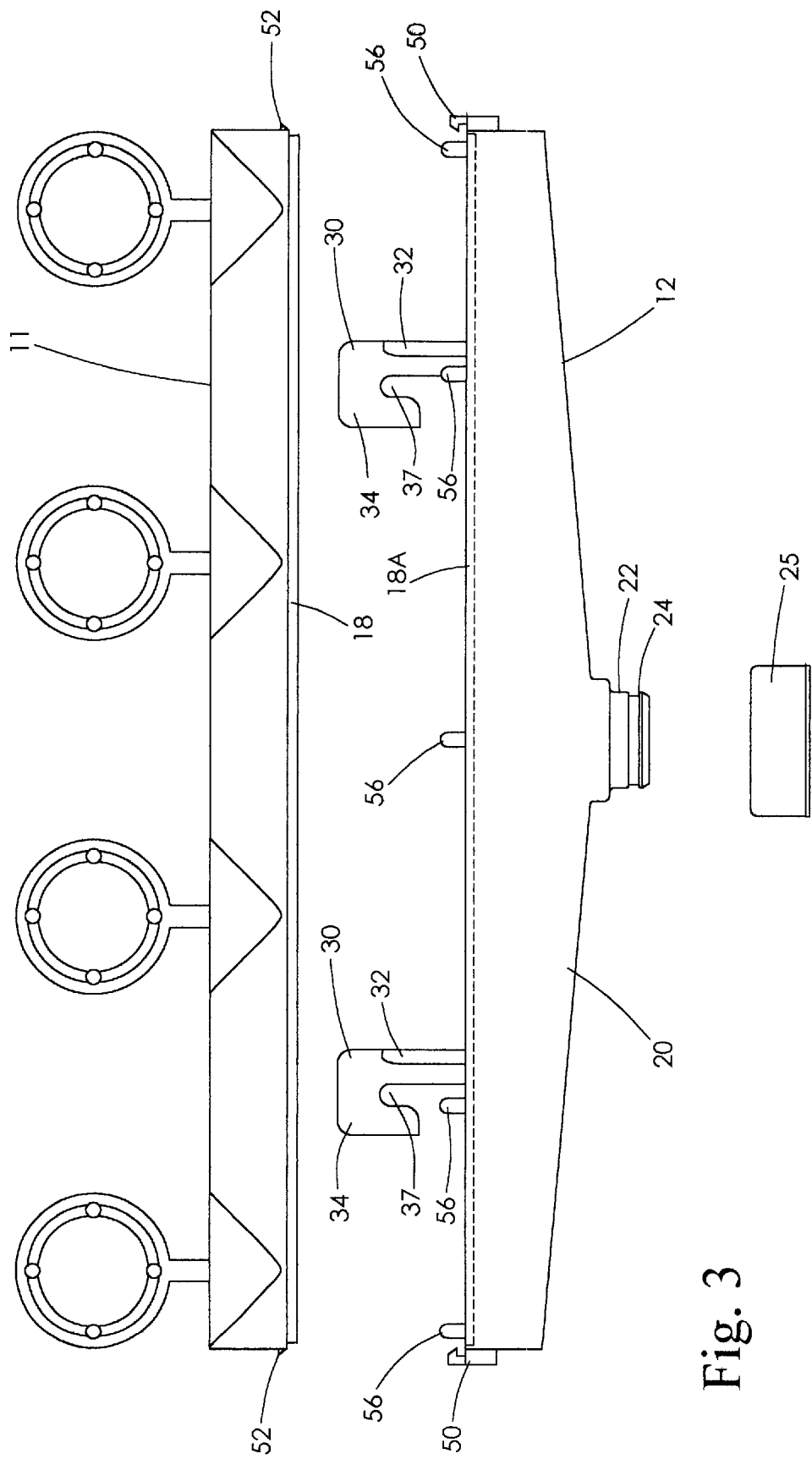
FIG. 3 shows an exploded front view of the device.

The device 10 comprises an upper delivery portion 11 defining a plurality of inlets 40, a lower funneling portion 12 having a downward grade 20 defining an outlet port 22. As shown in FIGS. 2 and 3, the connecting means of the present invention for the upper portion 11 and lower portion 12 inlcudes pins 56, sockets 58, catches 52, snaps 50, and opposite mating surfaces 18 and 18A, which are disposed around the circumferences, perimeter, or side walls of the upper portion 11 and lower portion 12. The upper portion 11 having a catch 52, and lower portion 12 having an end snap 50 at their distal ends for releasably mating upper and lower portions 11 and 12 of the device 10. Alternatively, other common connecting and mating means may be utilized.

As shown in FIG. 2, the lower portion 12 consists a retaining ring 24 positioned at the outlet port 22. The embodiment further includes a nozzle 25, which is preferably of the female threaded variety (threads not shown) consisting a inter-flange 26 positioned at the upper elevation of the nozzle 25 for mating the nozzle 25 above the retaining ring 24 and around the outer circumference of the outlet port 22. The nozzle 25 is pivotally mounted to the outlet port. It is to be understood that other common retaining means may also be used such as C-clip. As shown in FIG. 1, a recovery container, or a reservoir 28 having mating threads (threads not shown) is secured to the nozzle 25. A container 14 having an open mouth is inserted into the inlet 40, and retained by a close tolerance fit. Container 14 and reservoir 28 are in fluid communication within the device 10. The device 10 includes a mounting means for mounting the device to a vertical surface consisting a pair of support brackets 30 extending generally vertical and outward from lower portion 12. The brackets 30 include a vertical gusset 32, and horizontal gussets 33 disposed on each side of the support brackets 30 and terminate in generally a flat elongated mounting plate 34 having an inverted U shaped notch 37 for receiving a mounting hardware such as a pan head style wood screw or other common hardware for mounting the device 10 to a wall. The hardware may be adjusted to allow easy removal and re-mounting of the device 10.

Figure 4:
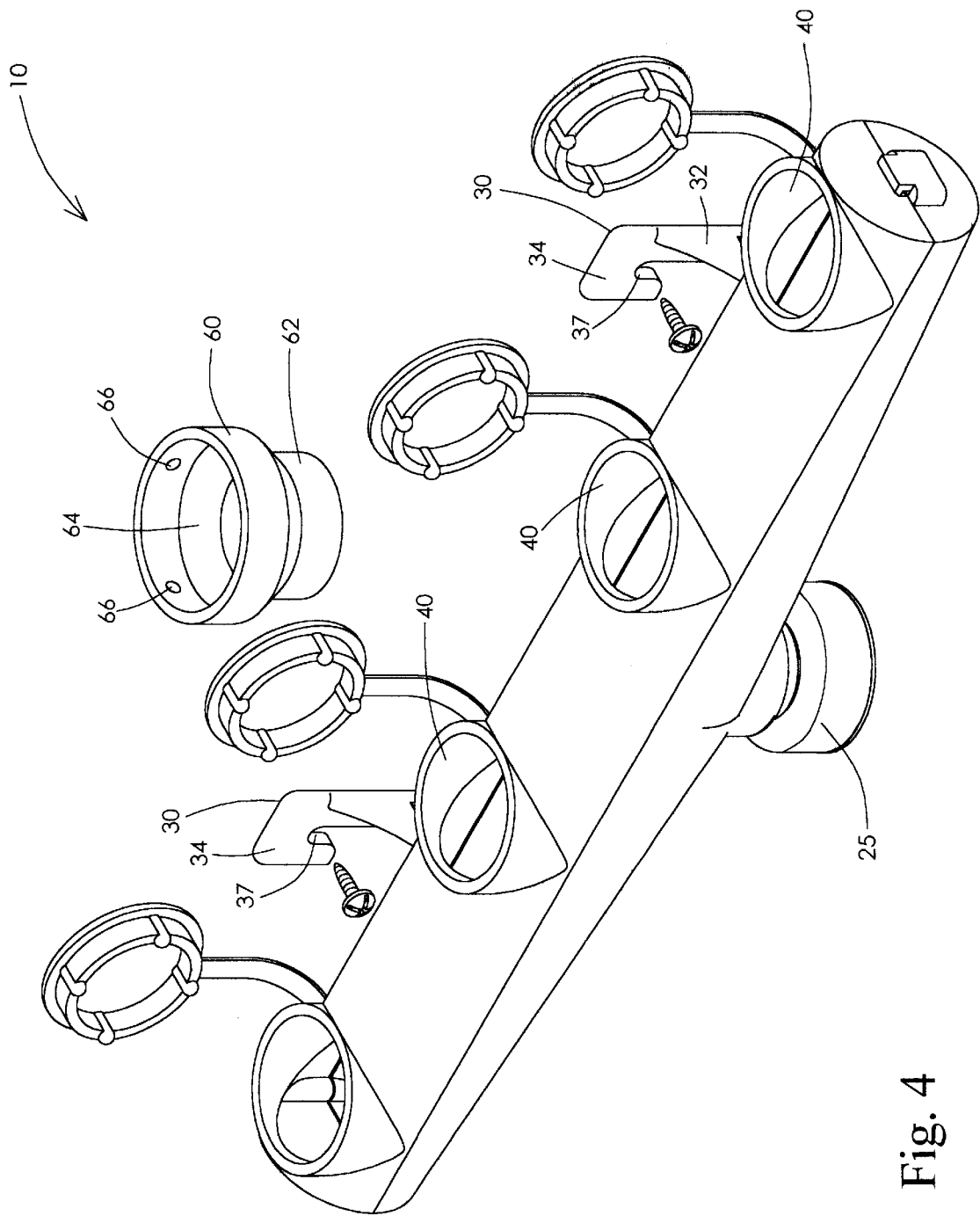
FIG. 4 shows the device assembled with an adaptor for a larger mouthed container.

The upper portion 11 further includes closures 42 for each inlet 40 for preventing contaminants from entering the device 10. As better shown in FIG. 2, the closure consists a protruding rim 44 containing a set of protuberances 45 disposed around the circumference of the rim 44. Closure 42 is connected to upper portion 11 by a strap 43. Upper portion 11, strap 43, and closure 42 are integrally connected as shown. Plastic oil containers have more than one sized filler neck. The device 10 may include the use of an adapting means for mating an optional sized container(not shown) within the same device 10. FIG. 4 shows the adapting means of the present invention consisting an upper diameter ring 60, and an inter-connected lower diameter ring 62 (as shown). A set of dimples 66 are disposed outwardly around the inner circumference of the upper diameter ring 60 for grasping the threads of an optional container. The lower diameter ring 62 is inserted into the inlets 40 and retained by a friction fit. The adapting means may be an integral part of the device 10 accepting optional filler neck sizes.

In a further embodiment of the present invention, and referring to all the present figures and forgoing description, there is disclosed a device for recovering fluids from at least one container 13. The device comprises an upper delivery portion 11 having at least one inlet 40 for receiving a container 13, a lower funneling portion 12 having a downward grade 20, and an integrally connected outlet port 22. The device further includes connecting means which may include clips, pegs, joints, or other structures for securing parts together. The connecting means of the present invention may include one of variety of snaps 50, catches 52, pins 56, and sockets 58. It can be appreciated that upper portion 11 and lower portion 12 can be mated together with other common connecting structure including a hinge or jointing. The connecting means is employed for connecting the upper portion 11 and lower portion 12. The device further includes a retaining means positioned at the outlet port 22. Retaining means is preferably a seat 24 (as shown), which is defined by the outlet port 22. The embodiment further includes a nozzle 25 which is of the male threaded variety. The nozzle 25 is pivotally mounted at the outlet port 22 by the retaining means. The nozzle 25 has a securing means for securing a reservoir 28 having mating threads. The embodiment further includes mounting means including at least one support member for mounting the device to a vertical surface such as a wall, work bench or other convenient location. The mounting means are preferably configured to allow for easy setup and/or easy removal or takedown of the device as desired. Fluid from at least one container 13 drains through the device 10 and into the reservoir 28. Accordingly, because of many plastic containers having offset filler necks, the rotating nozzle 25 permits the device 10 to be mounted in close proximity to a wall reducing the distance between the lower portion 12 and the mounting plate 34. The device 10 preferably does not extend greatly into a work space or other area. Instead, a recovery container can be secured to the device 10 without requirement for twisting, rotating, or screwing the reservoir 28 onto device 10. The rotating nozzle 25 allows a user to attach the reservoir 28 to the device with ease and adjust the receiving container allowing readily viewing access to a sight strip 29 of the reservoir 28 which is commonly used on plastic containers preventing seepage or spill from overlfow. Common and like features as described earlier in the specification may be included in the present embodiment in various forms and formulations.

All parts are preferably injection molded with a suitable plastic although other types of materials or other manufacturing processes may be utilized. Alternatively, a one piece molding for the upper and lower portions 11 and 12 could also be obtained. Plastics have a greater tolerance and allow parts to be simply snapped together. The type of plastic used is preferably that which allows one to view the matter that is passing through the device 10 for detecting contaminants or viewing the fluids therein. Using separate pieces for the upper portion 11 and lower portion 12 assists in ease and low cost of manufacture making available common manufacturing techniques in the plastics industry.

Although the description above contains many specificites, these should not be construed as limiting the scope of the invention, but merely providing an illustration of some of the presently preferred embodiments of this invention.

What is claimed is:

1. A device for recovering fluid from at least one container, said device comprising:
 a) a funnel member having an upper portion, a lower portion and side wall portions, said side wall portions connect said upper and lower portions, said lower portion having a downward grade,
  wherein said upper portion having a catch and said lower portion having a snap at their distal ends for releasably mating said upper and lower portions;
 b) at least one inlet located in said upper portion;
 c) an outlet port being connected to said lower portion;
 d) a retaining means being located around said outlet port;
 e) a nozzle pivotally mounted on said outlet port by said retaining means, said nozzle having one end for mating with said retaining means and an opposite threaded end for receiving a reservoir having mating threads; and
 f) means for mounting the device to a vertical surface including at least one support member extending generally perpendicular outward to said vertical surface.

2. The device of claim 1 further comprises an adapting means for said inlet for receiving a larger mouthed container.

3. The device of claim 2 wherein said adaptor is dimpled in its interior for retaining a larger mouthed container by its threads.

4. The device of claim 1 is made of a transparent plastic material for detecting contaminants entering said device.

5. The device of claim 1 wherein said upper and lower portions can be disassembled for cleaning.

6. The device of claim 1 wherein said nozzle can be rotated on said retaining means to allow the adjustment of the reservoir.

7. The device of claim 1 wherein said upper portion comprises a closure for said inlet.

8. A device for recovering fluids from at least one containers, said device comprising:

an upper funnel portion having at least one inlet for receiving a container;

a lower funnel portion having a downward grade and an outlet port;

a connecting means for detachably connecting said upper funnel portion with said lower funnel portion; wherein said connecting means is selecting from the group consisting of at least one catch and snap, at least one pin and mating socket, at least one hinge, and at least one pair of opposite mating surfaces;

a retaining means positioned at said outlet port;

a nozzle pivotally mounted at said outlet port by said retaining means, said nozzle having securing means for securing a reservoir; and mounting means for mounting said device to a vertical surface;

wherein fluid from at least one container drains through said device and into the reservoir, and wherein said upper funnel portion and said lower funnel portion may be selectively connected and disconnected for cleaning and repair.

9. The device of claim 8 wherein said outlet port defines said retaining means.

10. The device of claim 8 wherein said retaining means is a seat.

11. The device of claim 8 wherein said upper funnel portion having an integrally connected closure for said inlet.

12. The device of claim 8 wherein said securing means is threads.

* * * * *

UNITED STATES PATENT AND TRADEMARK OFFICE
CERTIFICATE OF CORRECTION

Figure 5:
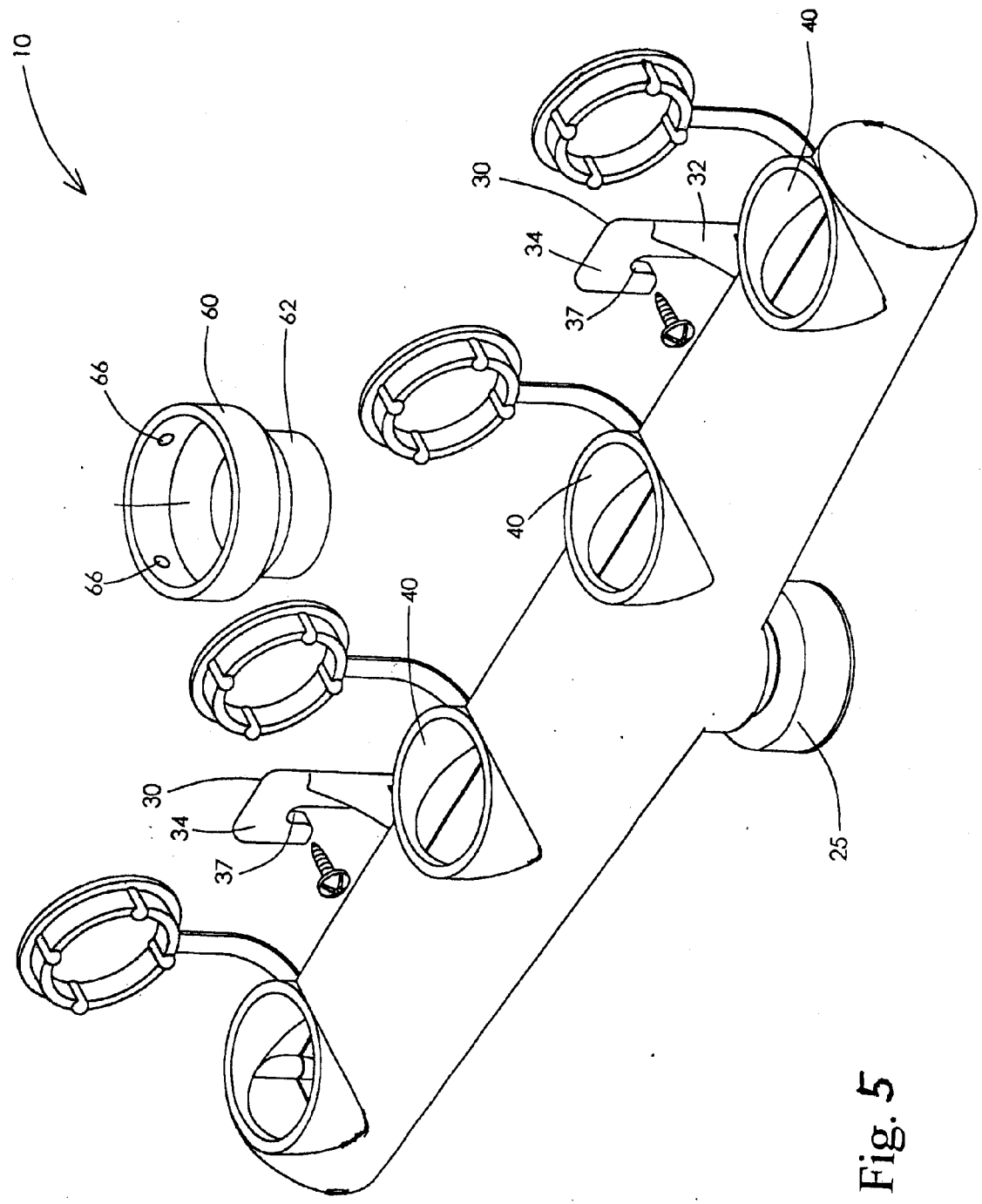
FIG. 5 shows another embodiment of the device assembled with an adaptor for a large mouthed container.

PATENT NO.   : 6,405,765 B1
DATED        : June 18, 2002
INVENTOR(S)  : Rickie Michael Handrick It is certified that error appears in the above-identified patent and that said Letters Patent is hereby corrected as shown below:

Drawings,
Delete Figure 5, and substitute therefor the drawing Figure, consisting of Figure 5, as shown on the attached pages.

Column 1,
Line 29, delete "to" and add -- too --;

Columns 4-6,
Delete claims 8-12 from the patent.

Signed and Sealed this

Twenty-sixth Day of November, 2002

Attest:

JAMES E. ROGAN
Attesting Officer   Director of the United States Patent and Trademark Office